US009046075B2

(12) United States Patent
Kanemoto (10) Patent No.: US 9,046,075 B2
(45) Date of Patent: Jun. 2, 2015

(54) WIND TURBINE GENERATOR (75) Inventor: Toshiaki Kanemoto, Fukuoka (JP)

(73) Assignees: KYUSHU INSTITUTE OF TECHNOLOGY, Fukuoka (JP); KYOWA ENEGINEERING CONSULTANTS CO., LTD., Tokyo (JP)

( * ) Notice: Subject to any disclaimer, the term of this patent is extended or adjusted under 35 U.S.C. 154(b) by 738 days.

(21) Appl. No.: 13/147,021

(22) PCT Filed: Jan. 28, 2010

(86) PCT No.: PCT/JP2010/000501
§ 371 (c)(1),
(2), (4) Date: Aug. 31, 2011

(87) PCT Pub. No.: WO2010/087178
PCT Pub. Date: Aug. 5, 2010

(65) Prior Publication Data
US 2012/0091721 A1 Apr. 19, 2012

(30) Foreign Application Priority Data

Jan. 30, 2009 (JP) ................................. 2009-020675

(51) Int. Cl.
F03D 9/00 (2006.01)
H02P 9/04 (2006.01)
F03D 1/02 (2006.01)
F03D 1/06 (2006.01)

(52) U.S. Cl.
CPC .............. *F03D 1/025* (2013.01); *F03D 1/0608* (2013.01); *Y02E 10/721* (2013.01)

(58) Field of Classification Search
USPC ............................ 416/3, 120, 223; 290/44, 55
See application file for complete search history.

(56) References Cited

U.S. PATENT DOCUMENTS

| 6,769,873 | B2 * | 8/2004 | Beauchamp et al. ............. 416/3 |
| 7,074,011 | B1 | 7/2006 | Wobben |
| 8,317,479 | B2 * | 11/2012 | Vronsky et al. ........... 416/196 R |
| 8,393,865 | B2 * | 3/2013 | Vronsky et al. ................. 416/23 |

(Continued)

FOREIGN PATENT DOCUMENTS

| JP | 2003-129935 | 5/2003 |
| JP | 2003-526757 | 9/2003 |

(Continued)

OTHER PUBLICATIONS

International Search Report issued Apr. 20, 2010 in International (PCT) Application No. PCT/JP2010/000501.

(Continued)

*Primary Examiner* — Tulsidas C Patel
(74) *Attorney, Agent, or Firm* — Wenderoth, Lind & Ponack, L.L.P.

(57) ABSTRACT

In the wind turbine generator, a front wind rotor includes a blade designed, in an area outer than an intermediate of a rotation radius of the front wind rotor, to have a blade element comprised of an aerofoil being cambered in a cross-section along a rotational direction thereof, and is radially twisted so as to ensure an angle of attack smaller by a predetermined stable margin angle than an angle of attack providing a maximum lift-drag ratio regardless of a radial position, and further designed, in an area inner than the intermediate of a rotation radius of the front wind rotor, to be radially twisted so as to ensure an angle of attack at which a drag acting on the blade element is made small, and a total force of the drag and a lift force is axially directed, regardless of a radial position.

5 Claims, 8 Drawing Sheets

(56) References Cited

U.S. PATENT DOCUMENTS

| | | | |
|---|---|---|---|
| 2010/0028161 A1* | 2/2010 | Vronsky et al. | 416/238 |
| 2010/0028162 A1* | 2/2010 | Vronsky et al. | 416/241 R |
| 2011/0223021 A1* | 9/2011 | Grife et al. | 416/1 |
| 2012/0020803 A1* | 1/2012 | Lees et al. | 416/233 |
| 2013/0022463 A1* | 1/2013 | Zuteck et al. | 416/1 |

FOREIGN PATENT DOCUMENTS

| | | |
|---|---|---|
| JP | 2004-84522 | 3/2004 |
| JP | 2004-100546 | 4/2004 |
| JP | 4040939 | 11/2007 |
| JP | 2009-47069 | 3/2009 |

OTHER PUBLICATIONS

Toshiaki Kanemoto et al., "Development of Intelligent Wind Turbine Generator with Tandem Wind Rotors and Double Rotational Armatures", (1$^{st}$ Report, Superior Operation of Tandem Wind Rotors), JSME International Journal, Section B, vol. 49, No. 2, pp. 450-457, 2006.

Toshiaki Kanemoto et al., "Almighty High Output Type Intelligent Wind Turbine Generator with Tandem Rotors", Proceedings of FEDSM2007, 5$^{th}$ Joint ASME/JSME Fluids Engineering Conference, FEDSM 2007-37534, Jul. 30-Aug. 2, 2007.

Koichi Kubo et al., "Development of Intelligent Wind Turbine Unit with Tandem Wind Rotors and Double Rotational Armatures", (2$^{nd}$ Report, Characteristics of tandem wind rotors), Journal of Fluid Science and Technology, vol. 3, No. 3, pp. 370-378, 2006.

Michihiro Nishi et al., "Aerodynamic Performance of a Drag-Controlled Vertical Axis Wind Turbine", pp. 44-50, Dec. 2006.

Sung Nam Jung et al., "Aerodynamic performance prediction of a 30 kW counter-rotating wind turbine system", Renewable Energy, 30, pp. 631-644, 2005.

* cited by examiner

(a) AFFECTION BY NUMBER OF BLADES IN FRONT WIND ROTOR (b) AFFECTION BY NUMBER OF BLADES IN REAR WIND ROTOR

FIG. 4

(a) AFFECTION BY NUMBER OF BLADES IN FRONT WIND ROTOR (b) AFFECTION BY NUMBER OF BLADES IN REAR WIND ROTOR

(a) FRONT WIND BLADE "G"

(b) REAR WIND BLADE "G"

(a) TANDEM WIND ROTORS EE    (b) TANDEM WIND ROTORS GE

(a) FRONT WIND BLADE "H"

(b) REAR WIND BLADE "G"

FIG. 12

(a) TIP-SIDE (b) HUB-SIDE

WIND TURBINE GENERATOR

CROSS-REFERENCE TO RELATED APPLICATION

The present application is a U.S. National Stage of International Application No. PCT/JP2010/00501 which was filed on Jan. 28, 2010 and claims priority under 35 U.S.C. §119 from Japanese Patent Application No. 2009-020675 which was filed on Jan. 30, 2009.

BACKGROUND OF THE INVENTION

1. Field of the Invention

The invention relates to a tandem rotor type wind turbine generator which makes it possible to enhance an efficiency of power generation.

2. Description of the Related Art

Figure 1:
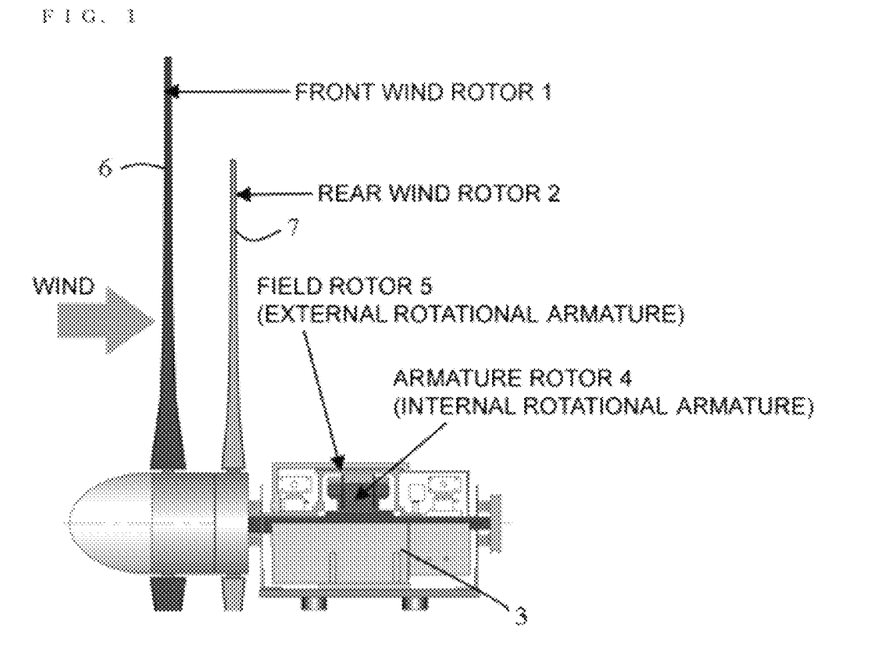
FIG. 1 is a schematic view illustrating a tandem rotor type wind turbine generator (up-window type) proposed in Japanese Patent No. 4040939.
Figure 2:
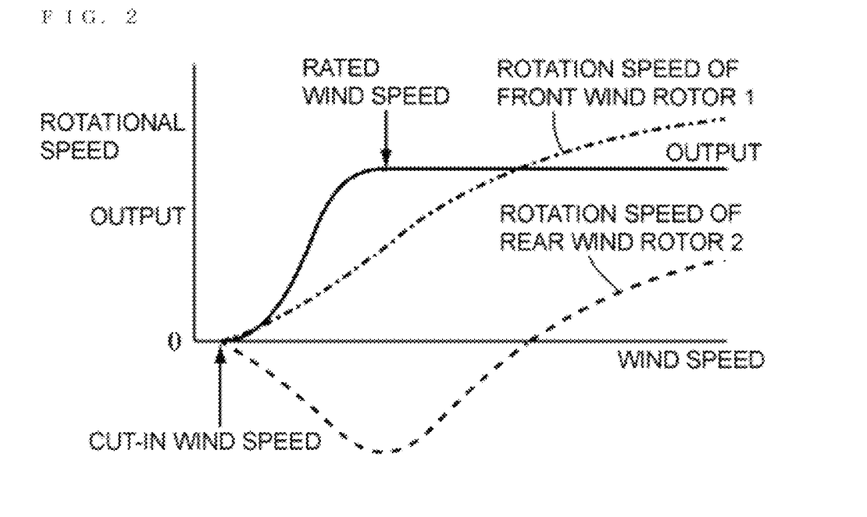
FIG. 2 is a graph showing a relation among a rotation speed and an output of the tandem wind rotors shown in FIG. 1, a wind velocity.

A new type wind turbine generator, where the large and the small sized wind rotors drive, respectively, the inner and the outer armatures of the peculiar generator having no traditional stator, was proposed by the inventor of the present application to overcome the problems found in the existing wind turbine generators which are just an extension of conventional wind turbine generators suitable to Europe and U.S.A. both having good wind conditions, enable the wind turbine generator to be suitable to varied wind conditions, and to improve the performance, and was already patented (see Patent Document 1). FIG. 1 illustrates a conceptual view of the wind power unit, and FIG. 2 shows the performances/ operations of the wind power unit. The proposed tandem rotor type wind power unit illustrated in FIG. 1, includes a front wind rotor 1 and a rear wind rotor 2 arranged coaxially with each other. The front wind rotor 1 is connected to an armature rotor 4 (inner rotational armature) of a generator 3, and the rear wind rotor 2 is connected to a field rotor 5 (outer rotational armature) of the generator 3. A direction in which a blade 6 of the front wind rotor 1 is twisted axially opposite to a direction in which a blade 7 of the rear wind rotor 2 is twisted. FIG. 1 shows an up-wind type unit in which the wind rotors are arranged upstream of a tower mounting the generator 3 therein. The proposed wind power unit is applicable to a down-wind type unit in which wind rotors are arranged downstream of a tower, by switching left-right (front-rear) of the wind rotors illustrated in FIG. 1 so as to take the wind coming from the right side.

The tandem rotor type wind power unit is characterized by rotational behavior of the tandem wind rotors, where the rotational directions and speed are unsettled while the rotational torque acting on the armature rotor 4 coincides with the same acting on the field rotor 5 of the generator 3. The wind power unit is not equipped with any accelerators, and the front and the rear wind rotor shafts are connected to the armature rotor 4 and the field rotor 5 of the power generator 3, respectively. Then, the rotational speeds and directions of the wind rotors are defined as follows in response to the wind velocity, while the rotational torques acting on the armature rotor 4 and the field rotor 5 are equal to each other, that is, the front wind rotor 1 and the rear wind rotor 2 work at the same rotational torque (but in opposite directions), as mentioned above. As shown in FIG. 2, the front wind rotor 1 and the rear wind rotor 2 start rotating in opposite directions (counter-rotation) at a cut-in wind velocity. The rotation speeds of the wind rotors increase with the increase of the wind velocity, and the wind power unit is put into the rated operation mode with the constant output, when the rotational speed of the rear wind rotor 2 reaches a rotational speed close to the maximum rotational speed. As the wind velocity-increases more, the rear wind rotor 2 is gradually decelerated so as to coincide with the rotational torque of the front wind rotor 1 which is greater than the torque of the rear wind rotor, and then stops. Continuously, the rear wind rotor 2 starts rotating in the same direction as the front wind rotor 1 (blowing mode against the coming flow). Such rotational behaviors can be accomplished in precisely cooperation with the inner/outer double rotor (rotational armature/rotational field) type power generator 3.

Reference 1 (identified below) discusses the optimum number of the blades in the wind power unit.

Figure 3:
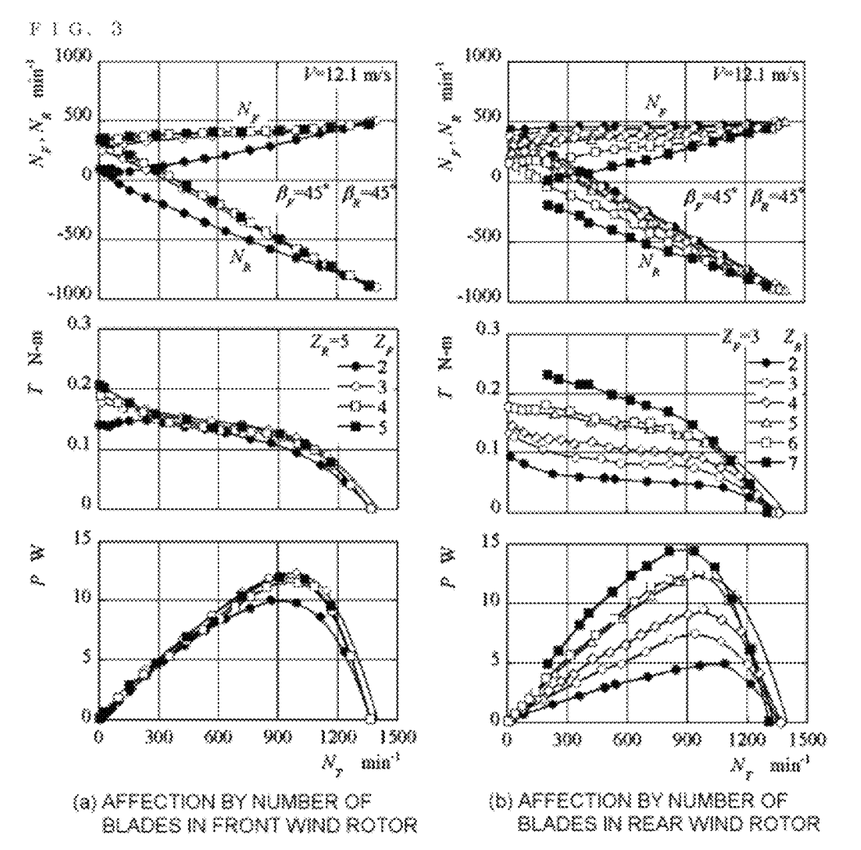
FIG. 3A is a graph showing the effect of a number of blades in a front wind rotor on performances in the case that a blade of a wind rotor is comprised of a flat plate as a simplest profile.
FIG. 3B is a graph showing the effect of a number of blades in a rear wind rotor on performances in the case that a blade of a wind rotor is comprised of a flat plate as a simplest profile.

In the case of the flat blades with simply a rectangular profile [the thickness=1.5 mm, (the diameter of the rear wind rotor)/(the diameter of the front wind rotor 500 mm)=$D_{RF}$=0.71], the effects of the blade number $Z_F$ and $Z_R$ of the front and the rear wind rotors on the turbine performances are shown in FIGS. 3A and 3B (the wind velocity V=12.1 m/s, the blade-setting angles $\beta_F=\beta_R=45°$, measured relative to a rotational directions). In FIGS. 3A and 3B, "$N_T$" indicates a relative rotation speed [$N_T=N_F-N_R$, $N_F$, $N_R$: the rotation speeds of the front and the rear wind rotors (a direction in which the front and rear wind rotors-rotate is defined as a positive)], "T" indicates a rotational torque, and "P" indicates the output. FIG. 3A shows the effects of the front blade number $Z_F$ on the performances in keeping the blade number of the rear blade $Z_R$=5, and FIG. 3B shows the effect of $Z_R$ at $Z_F$=3. Attention should be paid to the rotational behaviors of the rear wind rotor, though it is almost the same as the traditional wind turbines having the single wind rotor that the rotational torques are affected by the rotational speed and the rotors have the optimum rotational speed which ensures the maximum output.

That is, as mentioned above, the rear wind rotor must counter-rotate against the front wind rotor at the comparatively lower rotational torque (the counter-rotation, in the operation from the extremely slow wind velocity to the moderately higher wind velocity than the rated wind velocity), and start rotating the same direction as the front wind rotor with the increase of the rotational torque (the same-directional rotation, in the operation at the higher wind velocity). Though the number of blades in the front wind rotor scarcely affects the rotational torque and the output, in the case of $Z_F$=2, the rear wind rotor is not expected to accomplish the same-directional rotation as the front wind rotor on which the present concept is based. Judging resultantly from the output power and so on, $Z_F$=3 is desirable in the same way as the traditional single rotor wind turbine generator [FIG. 3A]. On the contrary, the number of blades in the rear wind rotor remarkably affects the performance [FIG. 3B]. As the number of blades in the rear wind rotor increases, the rotation torque and the output increase, the rotational speed of the front wind rotor $N_F$ decreases, and the speed of the rear wind rotor $N_R$ increases in an absolute value. As a result, estimating the mixture of a reciprocal rotation and a common-direction rotation, and an output power, the optimal number of blades in the rear wind rotor is $Z_R$=4-6, taking the rotational behaviors (not only the counter-rotation but also the same-directional rotation) into account.

Figure 4:
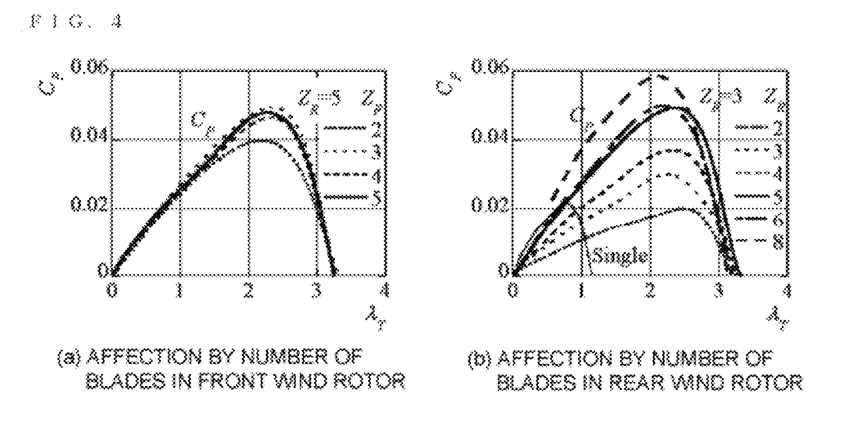
FIG. 4A shows the effect of the number of blades in a front wind rotor on a relative circumferential speed ratio.
FIG. 4B shows the effect of the number of blades in a rear wind rotor on a relative circumferential speed ratio.

Rearrangement of FIGS. 3A and 3B is shown in FIGS. 4A and 4B, where the relative rotational speed $N_T$ was rewritten with the relative tip speed ratio $\lambda T$[=(the relative circumferential velocity between the front and the rear wind rotors)/(the wind velocity)] and the output was rewritten with the output coefficient $C_P$[=$P/(\rho AV^3/2)$, $\rho$: density of air, A: a projection area of the wind rotor receiving the wind]. Since the similarity law was confirmed with respect to the wind velocity, the experimental results at various wind velocities are represented with a single curve. As mentioned above, the number of the blades in the front wind rotor hardly affects $C_P$, but the number of blades in the rear wind rotor significantly affects $C_P$. The thin solid line in FIG. 4B shows the output coefficient $C_P$ of the front wind rotor while only the front wind blades are employed, "Single", this corresponds to a single rotor wind turbine generator, it is not so meaningful to evaluate the value of the output coefficient $C_P$ because the flat plate cannot be expected to reach a high output. Providing the tandem (two stages) wind rotors for the wind power unit, the optimal relative tip speed ratio $\lambda_T$ providing the maximum output is almost three times faster than that of the single wind rotor, and furthermore, the output coefficient $C_P$ is almost 2.5 times higher at $Z_R$=5 than Cp of the single wind rotor.

The optimal diameter ratio and the optimal axial distance between the front and the rear wind rotors are discussed in References 2 and 3 (both identified below).

Figure 5:
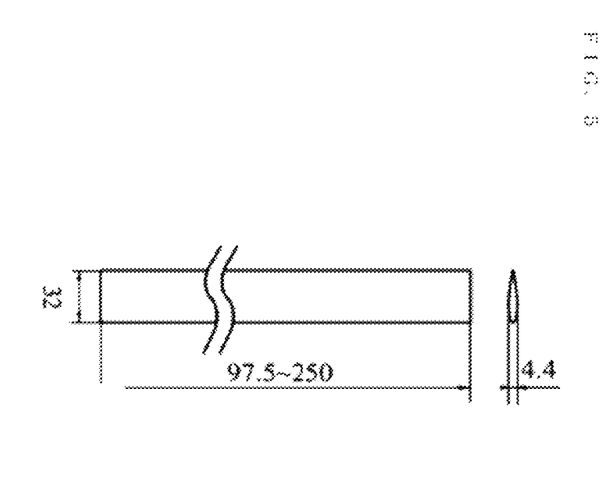
FIG. 5 includes a side view and a cross-sectional view of a two-dimensional non-twisted blade E comprised of a non-curved blade element having a symmetrical blade profile.
Figure 6:
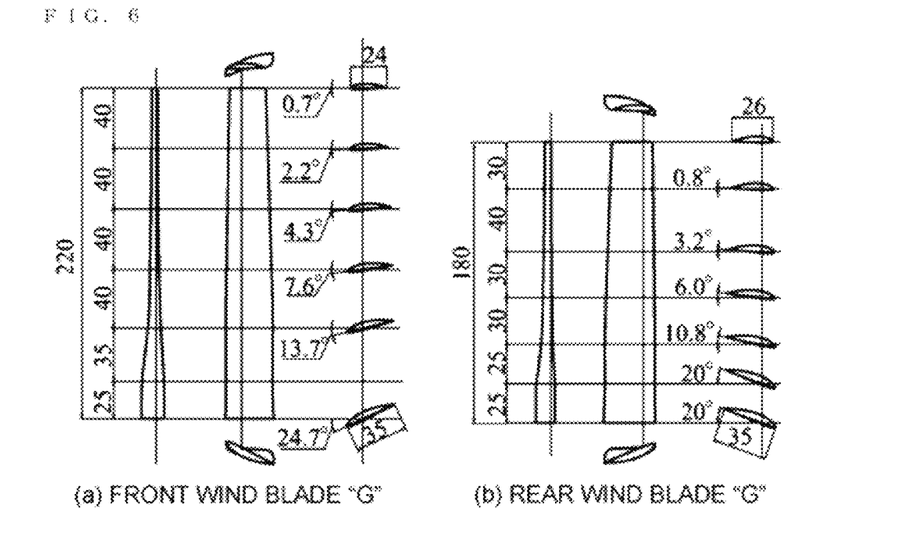
FIG. 6A shows the side view, a front view, a plan view, a bottom view, and the cross-sectional views of a blade G radially twisted so as to ensure an optimal angle of attack regardless of a radius in a front wind rotor.
FIG. 6B shows a side view, a front view, a plan view, a bottom view, and the cross-sectional views of a blade G radially twisted so as to ensure an optimal angle of attack regardless of a radius in a rear wind rotor.

In order to optimize the diameter ratio and the axial distance, two blade profiles were prepared (a diameter of the front wind rotor is 500 mm). One is a two-dimensional blade E formed with the symmetrical aerofoil without the camber (FIG. 5), and the other is the cambered blade G formed with MEL002 aerofoil suggested by National Institute of Advanced Industrial Science and Technology (http://riodb.i-base.aist.go.jp/db060/index.html) with the desirable angle of attack irrespective of the radius (FIGS. 6A and 6B). Hereinbelow, for the sake of simplification in expression, alphabets for those blades are expressed in a front-rear order. For instance, the tandem wind rotor including the front wind rotor having the front blade G and the rear wind rotor having the rear blade E is expressed as "GE". The setting angles $\beta_F$ and $\beta_R$ measured relative to the each rotational direction at blade tips-of the front and the rear wind rotors have been optimized by the preliminary research.

Figure 7:
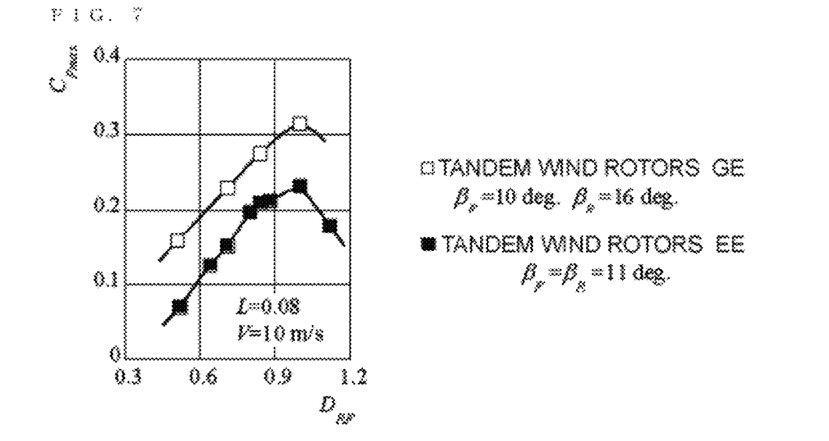
FIG. 7 is a graph showing how a ratio between radii of front and rear wind rotors affects an output coefficient.
Figure 8:
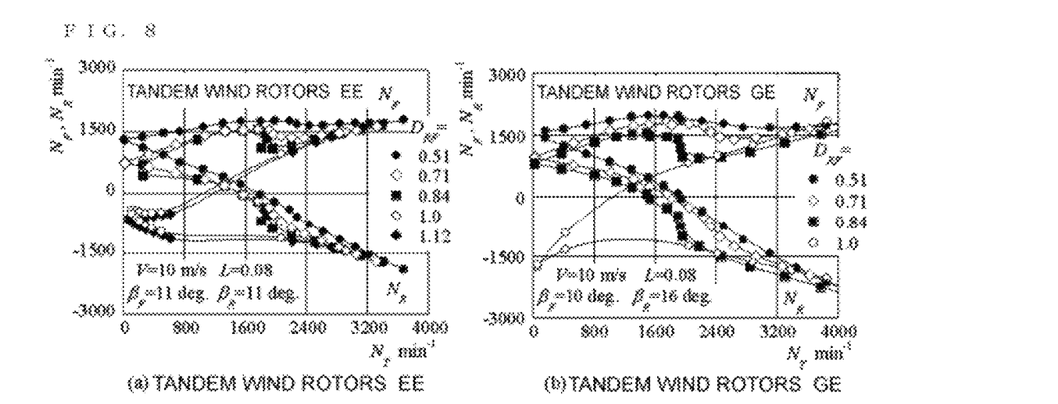
FIG. 8A shows rotation behavior of the tandem wind rotors EE.
FIG. 8B shows rotation behavior of the tandem wind rotors GE.

FIG. 7 shows the effects of the diameter ratio $D_{RF}$ ($D_{RF}=d_R/d_F$, $d_F$, $d_R$: the diameter of the front and the wind rotors) on the output performances, where "$C_{PMAX}$" indicates a maximum output coefficient $C_P$ at each diameter ratio $D_{RF}$, and "L" indicates a non-dimensionally axial distance between the front and the rear wind rotors axes (see later-mentioned FIG. 9). The large sized rear wind rotor, regardless of the profile, contributes to increase the output as the tandem wind rotors (maximum at $D_{RF}$=1), because the rotor can catch the wind energy running outward (see later-mentioned FIGS. 10A and 10B) in comparison with the smaller wind rotor. FIGS. 8A and 8B, however, suggests that the rear wind rotor rotates in the same direction as the front wind rotor at the slow relative rotational speed $N_T$ while $D_{RF}$ is smaller than 0.84 but the front wind rotor rotates in the same direction as the rear wind rotor while $D_{RF}$ is larger than 0.84. The latter rotational behavior greatly deviates from the concept of the proposed wind power unit. Accordingly, the optimal diameter ratio $D_{RF}$ which meets the concept and provides high output is about 0.84.

Figure 9:
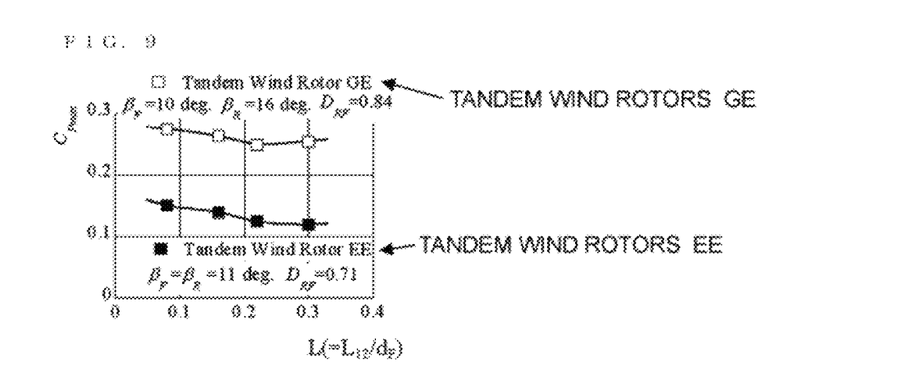
FIG. 9 is a graph showing how a distance between axes of front and rear wind rotors affects output performances.
Figure 10:
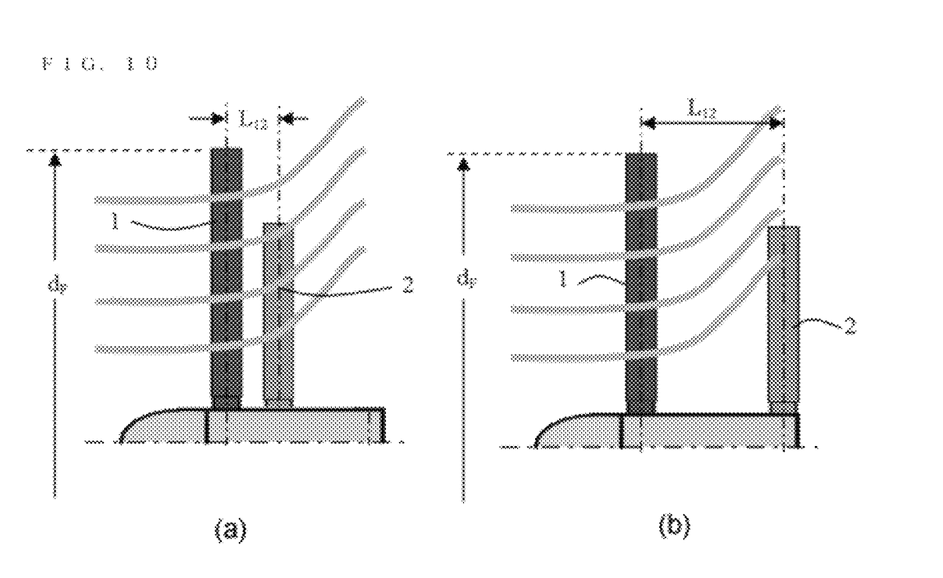
FIG. 10A shows a condition of air flowing around wind rotors in a case wherein a distance between axes is short.
FIG. 10B shows a condition of air flowing around wind rotors in a case wherein a distance between axes is long.

FIG. 9 shows the effects of the axial distance L ($=L_{12}/d_F$, $L_{12}$: the distance between the front and the rear wind rotors) on the output $C_{PMAX}$ of the tandem wind rotors. The shorter the distance $L_{12}$ between the front and rear wind rotors is, the higher the output. Such results do not depend on the blade profile. This is because since a flow having passed over the front wind rotor 1 has a radially and outwardly directed velocity component, as illustrated in FIGS. 10A and 10B, the rear wind rotor 2 lets out the effective wind energy with the increase of the axial distance $L_{12}$ as shown in FIG. 10B. Accordingly, considering deflection and oscillation of the blade affected by the wind circumstances, it is preferable, as shown in FIG. 10A, to make the axial distance $L_{12}$ between the front and rear wind rotors as short as possible.

Reference 1: Toshiaki KANEMOTO and Ahmed Mohamed GALAL, Development of Intelligent Wind Turbine Generator with Tandem Wind Rotors and Double Rotational Armature (1st Report, Superior Operation of Tandem Wind Rotors), JSME International Journal, Series B, Vol. 49, No. 2 (2006-5), pp. 450-457.

Reference 2: Toshiaki Kanemoto, Hiromi Mitarai, Koichi Kubo, Noboru Aoki, Nobuyuki Esaki, Akinori Maeyama, Hidenori Eguchi, Hideharu Noda and Ikumi Yamada, Almighty High Output Type Intelligent Wind Turbine Generator with Tandem Rotors, Proceedings of the 5th Joint JSME-ASME Fluid Engineering Conference, (2007-7), CD-ROM FEDSM2007-37534.

Reference 3: Koichi Kubo and Toshiaki Kanemoto, Development of Intelligent Wind Turbine Unit with Tandem Wind Rotors and Double Rotational Armature (2nd Report, Characteristics of tandem wind rotors), Journal of Fluid Science and Technology, Vol. 3, No. 3, (2008-6), pp. 370-378.

The traditional wind turbine generators are based on the technologies regarding single stage propeller, and suitable to Europe and U.S.A. where a good/rich wind condition can be obtained for power generation, and has the following technical problems to be solved.

(a) Though the wind rotor having a large diameter can provide the higher output, it cannot work in a breeze. In contrast, a light-weight wind rotor having a small diameter is suitable to a breeze, but it provides low output even in a strong wind. That is, the diameter of the wind rotor affects the range in application of not only the power unit but also the wind circumstances.

(b) It is necessary for the conventional wind turbine generator to equip with the accelerator or a power generator having a large diameter and/or multipole, for accelerating at a speed at which a blade traverses a magnetic field generated by a power generator, for the sake of maintaining quality of electricity.

(c) In order to avoid a wind rotor and a tower from being damaged due to a strong wind, to prevent a power generator from being overloaded, and to keep the output constant in the rated operation mode, the traditional wind turbine generator must be equipped with a complex mechanism such as braking and/or pitch control systems to adjust the rotational speed.

(d) The traditional wind turbine generator comes into the rated operation mode in which the output is kept constant, when the wind velocity is equal to or greater than 11 m/s in general. For instance, an average wind velocity in Altamont Pass Wind Firm located on a hill in California State is about 11 m/s, and the average wind velocity in Middelgrunden Wind Firm located offshore of Denmark bay is about 9 m/s. In such areas with optimum wind conditions, the traditional wind turbine generator can operate extremely well as a means of power generation. However, in an area in which there is a remarkable difference between a breeze and a strong wind, and it is impossible to adequately obtain a wind condition suitable for a wind turbine generator, for instance, in Japan, an annual average wind speed is 5-8 m/s in solitary islands and capes, about 5 m/s on the seashores, 3 m/s for inland, and 5-10 m/s in the crest/summit of the mountains. The wind velocity of 11 m/s or faster at which the traditional wind turbine generator can work in the rated operation mode is obtained only in a restricted area and season/time. Since the output generated by the wind turbine generator is in proportion to a cube of a wind velocity, the output power remarkably lowers as wind velocity slows. Thus, in an area in which a wind condition is not suitably good enough for a wind turbine generator, it is desirable to increase the output even at the slow wind velocity.

It is considered, in the future, that an area suitable to the traditional wind turbine generator, which arbitrarily chooses the wind condition may reduce, and then the wind power unit providing the high output irrespective of the wind condition will be provided for the power generation.

The desirable profiles of the wind power unit, which can solve the problems mentioned above, are to (1) increase the output even at a low wind velocity, (2) lower the specified wind velocity at which the rated operation mode starts, and (3) take out accelerators, brakes, pitch control mechanism, and so on. The above-mentioned patented tandem rotor type wind power unit satisfies all of these requirements necessary for practical use.

However, as long as we keep the traditional research/development policies modifying/improving the single stage wind rotor based on aerodynamics, it may be impossible to expect dramatically advanced technologies beyond the present level. Then, new technologies have been proposed in a standpoint of the views different from the concepts of the inventor of the present application.

As a typical example, there is "Wind Lens" proposed by Toshiaki Ota et al. (see Japanese Patent Application Publication No. 2009-47069). This type enables the effective utilization of wind energy collecting the breeze/tiny wind, being difficult to use as they are, and make the output increase successfully. This type may be one of future prototypes, but applicable only to a small-capacity or small-size unit because the drag force induced from the diffuse duct surrounding the wind rotor acts witheringly on the tower. As for small sized wind turbines, a flexible blade has been proposed for reducing the acoustic noises and self-controlling the output at the strong wind, and a vertical-axis type windmill composed of the drag-controlled blade has been also proposed (Nishi et al., "Aerodynamic Performance of a Drag-Controlled Vertical Axis Wind Turbine", Turbomachinery, Vol. 34, No. 12, pp. 44-50, December 2006). In addition, in Korea, the wind rotor composed of the rear wind rotor with the same and/or larger diameter than the front wind rotor has been proposed (Sung Nam Jung et al., "Aerodynamic Performance Prediction of 30 kW Counter-rotating Wind Turbine System", www.sciencedirect.com, Renewable Energy 30 (2005), pp. 631-644).

The present invention relates to a wind rotor employed in the tandem rotor type wind power unit presented above. The inventor of the present application has developed a counter-rotating type hydroelectric unit composed of two-stage runners (impellers) and an inner/outer double rotational type generator. This hydroelectric unit, however, quite differs from the wind power unit proposed here, as follows.

(a) Runner channel: The flow rate (the axial velocity component) passing through the front runner is the same as the rate passing through the rear runner, as the runners are installed in the casing (the runner channel). On the contrary, the wind rotor brings the outward/radial flow as discussed above while the wind passes thorough the rotor, because the rotor works in a free stream. Accordingly, the axial velocity components passing through the front and the rear wind rotors are different from each other, and further, the flow conditions are significantly complex as the rear wind rotor works not only at the turbine mode but also at the blowing mode. Such modes affect doubtlessly the flow through the front wind rotor. Resultantly, it is necessary to establish newer blade design methods even if only the front wind rotor are taken into consideration, as the flow condition is different from a flow through the usual wind rotor.

(b) Rotational speed: Whereas the relative rotation speed (constant) between the front and the rear runners in the hydroelectric unit is dependent on the discharge at the power station, the speed of the proposed wind power unit is affected with the wind velocity and the power-generation load.

As mentioned above, since the flow interactions between the front and the rear wind rotors is intensive and the traditional design process for the single rotor type wind turbine generator cannot be applied to the tandem rotor type wind turbine generator. Hence, it is desired to establish a new design process.

It is an object of the present invention to provide a tandem rotor type wind turbine generator capable of enhancing an efficiency of power generation.

SUMMARY OF THE INVENTION

It is an object of the present invention to provide a tandem rotor type wind turbine generator capable of enhancing an efficiency of power generation.

In order to achieve the above-mentioned object, in the first aspect of the present invention, there is provided a wind turbine generator including a front wind rotor and a rear wind rotor arranged coaxially with each other, one of the wind rotors being connected to a rotatable armature rotor of a generator and the other being connected to a rotatable field rotor of the generator, the direction in which a blade of the front wind rotor is twisted being in the axially opposite direction to a direction in which a blade of the rear wind rotor is twisted, characterized in that a rotation radius of said rear wind rotor is designed to be smaller than a rotation radius of said front wind rotor, but longer than a half of the same, the front wind rotor includes a blade designed, in an area outer than an intermediate of a rotation radius of the front wind rotor, to have a blade element comprised of an aerofoil being cambered in a cross-section along a rotational direction thereof so as to ensure an expected rotational torque, and is radially twisted so as to ensure an angle of attack smaller by a predetermined stable margin angle than an angle of attack providing a maximum lift-drag ratio regardless of a radial position, the blade of the front wind rotor is designed, in an area inner than the intermediate of a rotation radius of of the front wind rotor, to be radially twisted so as to ensure an angle of attack at which a drag acting on the blade element is made small, and a total force of the drag and a lift force is axially directed, regardless of a radial position, in order to ensure a no-load condition.

As mentioned just above, the blade of the front wind rotor with the large diameter is designed to not only get the no-load condition but also reduce the drag force as possible at the smaller radius (namely the hub side) where the rotational torque makes hardly any contribution to the rotation. Such a blade scarcely works and passes directly/wholly the upstream wind energy to the rear wind rotor as it is at the small radius, and then ensures resultantly the effective can efficiently absorb energy absorption as the tandem wind rotors. Herein, "a maximum lift-drag ratio" means a lift-drag ratio providing a maximum value in a lift-drag curve against the angle of attack.

In a preferred embodiment of the present invention, the rear blade mentioned above is designed to include a blade element comprised of an aerofoil being cambered in a cross-section along a rotational direction thereof so as to ensure an expected rotational torque, the rear wind rotor is radially twisted in an area corresponding to the area outer than an intermediate of a rotation radius of the front wind rotor, so as to ensure an angle of attack smaller by a predetermined stable margin angle than an angle of attack providing a maximum lift-drag ratio to a swirling flow discharged from the front wind rotor, and the rear wind rotor is radially twisted in an area corresponding to the area inner than an intermediate of a rotation radius of the front wind rotor, so as to ensure an angle of attack smaller by a predetermined stable margin angle than an angle of attack providing a maximum lift-drag ratio against axial flow having no swirling components.

By designing the rear wind rotor with the appropriate blade presented just above, the rear wind rotor can efficiently absorb the wind energy in a whole range, and contributes to increase the output power as the tandem wind rotors.

In a preferred embodiment of the present invention, the front wind rotor and the rear wind rotor are set close to each other, the front wind rotor has three blades, and the rear wind rotor has four to six blades.

Such configurations enable the wind power unit to operate at the ideal conditions. That is, the rear wind rotor starts rotating in the opposite direction against the rotational direction of the front wind rotor at the breeze. The rotational speed of the rear wind rotor accelerates gradually and decelerates after reaching the maximum speed, with the increase of the wind velocity. While wind velocity further increases, the rear wind rotor stops once, and then, starts rotating in the same direction as the rotational direction of the front wind rotor.

In a preferred embodiment of the present invention, the rear wind rotor is characterized to have a radius about 0.84 times smaller than a radius of the front wind rotor.

This accomplishes counter-directional rotation, stopping and common-directional rotation of the rear wind rotor together with achievement of a maximum efficiency.

In a preferred embodiment of the present invention, the predetermined margin angle for operating the rotor at the stable condition is characterized to be in the range of 2 to 5 degrees both inclusive.

Thus, it is possible to maintain stability in operating the wind power unit turbine generator.

In a preferred embodiment of the present invention, the intermediate in the front wind rotor is located at 40 to 60% both inclusive of a radius of gyration of the front wind rotor.

Thus, it is possible to effectively transfer the wind energy existing in an inner area of the front wind rotor, to the rear wind rotor.

In accordance with the present invention, the blade of the front wind rotor is formed by the cambered aerofoil at larger than the intermediate radius of the rotor so as to get the rotational torque expected, and is given radially the twist so as to take the angle of attack smaller by a predetermined margin angle for operating the rotor at the stable condition than the angle of attack providing the maximum lift-drag ratio regardless of the radius, and the blade at smaller than the intermediate radius of the front wind rotor is radially twisted so as to take the no-load condition regardless of the radius by not only turning the resultant force combined the lift with the drag forces in the axial direction but also reduce—the drag acting on the blade element as possible. By such a present invention, it is possible to accomplish efficient wind energy conversion, and behave sufficiently the characterized performances the tandem rotor type wind turbine generator.

The above and other objects and advantageous features of the present invention will be made apparent from the following description made with reference to the accompanying drawings, in which like reference characters designate the same or similar parts throughout the drawings.

BRIEF DESCRIPTION OF THE DRAWINGS

FIG. 11A includes a front view, a side view, a plan view, a bottom view, and cross-sectional views of a blade H in a front wind rotor, and FIG. 11B includes, similarly to FIG. 6B, a side view, a front view, a plan view, a bottom view, and cross-sectional views of a blade G in a rear wind rotor. Dimensions shown in FIGS. 11A and 11B are of a small-sized blade used for a wind tunnel test.

DETAILED DESCRIPTION OF THE EMBODIMENTS OF THE INVENTION

An embodiment in accordance with the present invention will be explained hereinbelow with reference to drawings.

Figure 11:
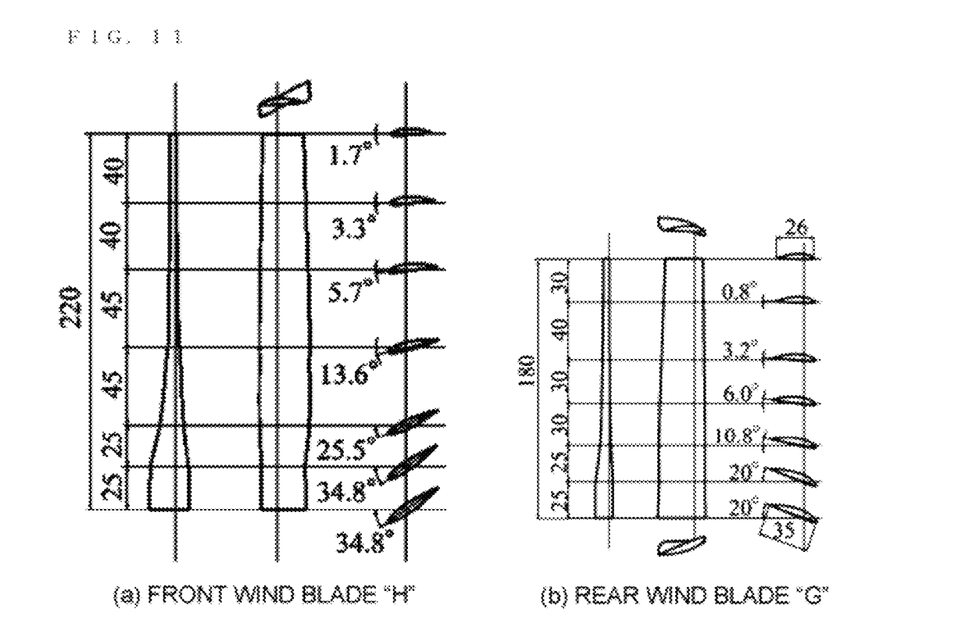

An example of the desirable blade profiles in the front wind rotor (front blade H) is shown in FIG. 11A.

The configurations of the tandem wind rotors suitable for embodying the present invention are as follows.

(a) A number of blades in the front wind rotor is 3, and a number of blades in the rear wind rotor is 4 to 6.

(b) A ratio of a diameter of the rear wind rotor to a diameter of the front wind rotor is about 0.84.

(c) The front and the rear wind rotors are set as close as possible.

Dimensions shown in FIG. 11A are of the experimental model (a diameter of a front wind rotor is 500 mm), and are expressed in the unit of "mm". The angle given in the cross-section of the blade is the setting values at each longitudinal (blade height) position. A blade of the rear wind rotor may be designed to have a profile shown in FIG. 11B, which is similar to the profile shown in FIG. 6B.

The blade of the front wind rotor is formed by the cambered aerofoil at the blade tip side, where the radius "r" is larger than 40-60% of the front wind rotor radius (about 50%: the guidance in the present embodiment), and is given radially the twist so as to take the angle of attack "α" smaller by a predetermined margin angle for operating the rotor at the stable condition than the angle of attack providing the maximum lift-drag ratio regardless of a radial position (hereinbelow, "α" is not the angle providing the maximum lift-drag ratio, but the angle of attack smaller by the predetermined margin angle than the angle of attack providing the maximum lift-drag ratio). The velocity triangles around the blade element at the arbitrary radius in the tip side are shown in FIG. 12A, where "u" is the rotational velocity (rotation speed: rε), "v" is the absolute velocity, "$v_m$" is the axial velocity component, "w" is the relative velocity, "α" is the angle of attach defined by the aerofoil chord and the relative velocity "$w_1$", and subscripts "1" and "2" indicate the values at the inlet and the outlet cross-sections respectively.

The wind rotor rotates by the component $F_T$ in the rotational direction of the resultant force "F" induced from the drag force "D" parallel to the vector average of the outlet/inlet relative velocities "$w_2$" and "$w_1$", and the lift force "L" perpendicular to the drag force "D". Accordingly, the larger lift-drag ratio ($\epsilon$=L/D) is, the higher the component $F_T$ in the rotational direction of the resultant force "F", that is, the output power is. For instance, in MEL002 aerofoil proposed by National Institute of Advanced Industrial Science and Technology the lift-drag ratio is maximized when the angle α of attack is equal to about 10 degrees. In order to keep the angle α of attack to be equal to 10 degrees regardless of a radius, with reference to the velocity triangles shown in FIG. 12A, the blade is radially twisted so that the angle "α" defined by the relative velocity "$w_1$" and the aerofoil chord is kept equal to 10 degrees regardless of a radius, where the relative velocity "$w_1$" can be derived from the wind velocity "$v_{m1}$" (constant in general) and the rotational velocity "u=rω". In the actual design, considering stability in rotation of the wind rotor, the angle of attack smaller by a predetermined margin angle than the angle providing the maximum lift-drag ratio is selected.

Figure 13:
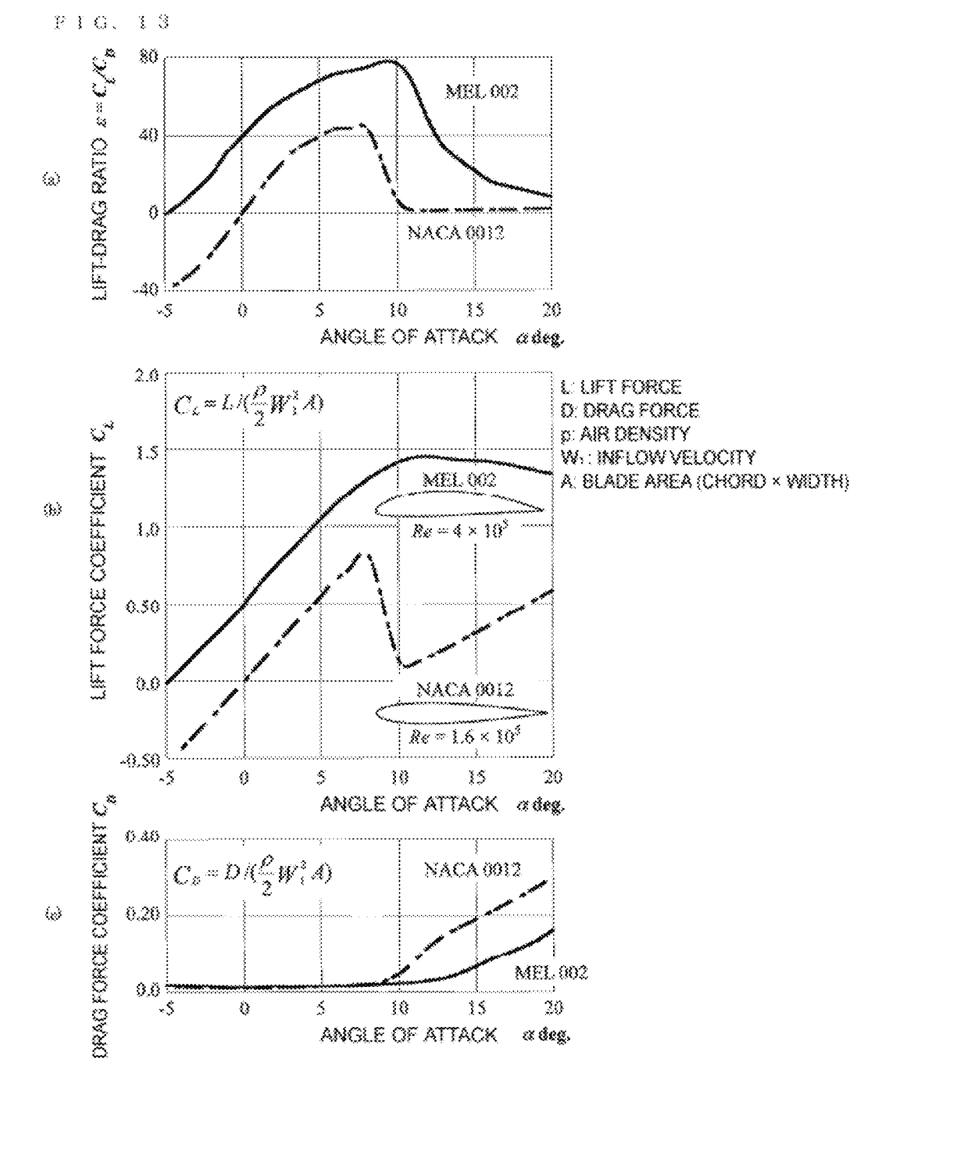
FIG. 13A shows a lift force ratio of a blade profile, published by Mechanical Engineering Laboratory (MEL) and National Advisory Committee for Aeronautics (NACA)
FIG. 13B shows a lift force coefficient of the same.
FIG. 13C shows a drag coefficient of the same.

A lift force L and a drag force D, that is, a lift-drag ratio ($\epsilon$=L/D) is affected by the blade profile. These forces are not uniform (not defined by a certain formulation), and hence, have to be get by the performance tests or the numerical flow simulation. FIGS. 13A, 13B and 13C show the performance curves of the aerofoil reported by National Institute of Advanced Industrial Science and Technology (MEL) and National Advisory Committee for Aeronautics (NACA), which is the predecessor of the National Aeronautics and Space Administration (NASA: Robert E. S. et al., Aerodynamic Characteristics of Seven Symmetrical Airfoil Sections Through 180-Degrees Angle of Attack for Use in Aerodynamic Analysis of Vertical Axis wind Turbines, SAND80-2114, 1981).

Figure 12:
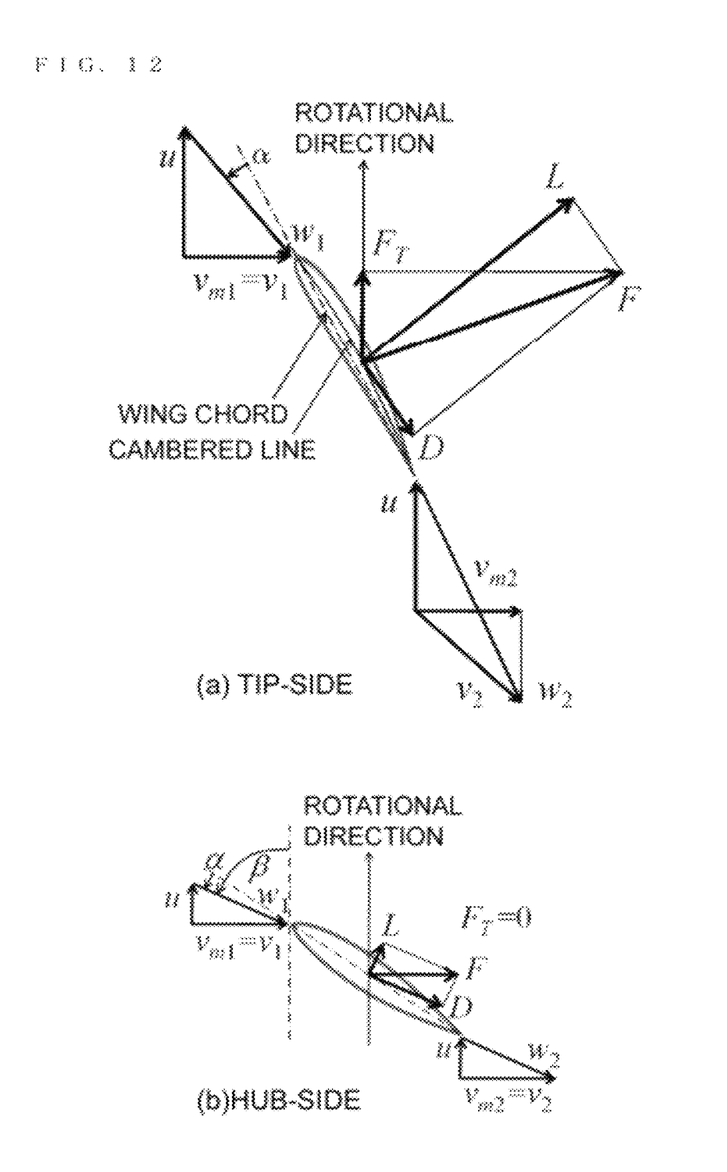
FIG. 12A shows velocity triangles at an inlet and an outlet of a front wind rotor, and a lift force, a drag force, and a total force acting on a blade at a tip side.
FIG. 12B shows velocity triangles at an inlet and an outlet of a front wind rotor, and a lift force, a drag force, and a total force acting on a blade at a hub side.

As confirmed with FIG. 12A, the higher rotational force $F_T$ can be obtained at the higher lift-drag ratio $\epsilon$=L/D. For instance, in MEL002 blade profile shown in FIG. 13A, the lift-drag ratio is the maximum where the angle α of attack is about 10 degrees. It is only necessary to design ideally the blade so as to take such an angle of attack. However, an actual wind fluctuates having a turbulence element. Furthermore, the rotational speed and the load may be varied due to some troubles of the wind turbine generator itself. Supposing, for example, the blade with MEL002 aerofoil designed at the angle of attack α=10 degrees, the actual angle of attack would become greater than 10 degrees if the rotational speed "u" becomes slow due to some disturbances (see FIGS. 12A and 12B). Then, the lift-drag ratio remarkably lowers (see FIGS. 13A, 13B and 13C, the decrease of the lift force and the increase of the drag force: stall), that is, the rotational force $F_T$ lowers—and the rotational speed of the wind rotor verges to decelerate more and more. In contrast, with the increase of the rotational speed, the angle of attack would become smaller than 10 degrees, and then the rotational speed can be restored to the normal operation because the rotational speed decelerates with the decrease of the lift-drag ratio.

For the above-mentioned reasons, an actually designed angle of attack is set smaller by predetermined margin angle for operating the rotor at the stable condition than the angle of attack providing the maximum lift-drag ratio, to make the operating range at the stable condition wide. How many degrees the angle of attack is set smaller is dependent on a design concept of the a manufacturer or an engineer, but the predetermined margin angle is 2 to 5 degrees in general, and the angle is about 3 degrees in the present embodiment.

The blade of the front wind rotor in the present invention is characterized by the profile at the hub side of the smaller radius (inner area: 60-40% of the rotation radius [=(the rotation radius–the radius of the outer area)/(the rotation radius)], about 50% in the present embodiment), which scarcely contributes to the rotational torque in a large-diameter wind rotor. That is, accomplishing no load condition by adopting a blade element whose drag force is as small as possible, the front wind rotor does not work at the smaller radius and passes the upstream wind energy as it is to the rear wind rotor. As shown in FIG. 12B, the angular momentum through the front wind rotor does not change, while making the axial flow at the inlet ($v_1=v_{m1}$) discharge in the axial direction at the outlet ($v_2=v_{m2}$). In other words, the front wind rotor is in no-load condition at a hub side corresponding to the smaller radius, and hence, the front wind rotor does not absorb wind energy. Then, the relative velocities "$w_1$" and "$w_2$" are doubtlessly in the same direction. No angular momentum change at both inlet and outlet of the wind rotor means that no force ($F_T$=0) acts on a blade element in the rotational direction (circumferential direction). That is, as shown in FIG. 12B, the resultant "F" composed of the drag force "D" and the lift force "L", acting on a blade element, is axially directed, so that the force component in the rotational direction "$F_T$" is equal to zero. In this flow condition, the relation between the lift force and the drag force is similar to the velocity triangle. The lift-drag ratio $\epsilon$ is given as follows.

$$\epsilon = L/D = u/v_{m1} = r\omega/v_{m1} \qquad (1)$$

The relative flow angle β measured from the rotational direction is given as follows.

$$\beta = \tan^{-1}(v_{m1}/r\omega) = \tan^{-1}(D/L) \qquad (2)$$

Accordingly, the direction of the blade element (aerofoil) at any point of the radius may be determined (twisting a blade), such that the angle α of attack taking the lift-drag ratio ε given by the equation (1) for the relative flow angle β given by the equation (2). At this design condition, since the resultant force "F" causes the momentum change in an axial direction, namely the decrease of the velocity in an axial direction, the blade element which provides a possibly smaller resultant force "F" namely the drag force "D" is selected. Though FIG. 12B shows a symmetrical blade profile as an example, a cambered blade element can also achieve the object.

As mentioned above, the output can be increased by assigning the rear wind rotor, the energy absorption at the smaller radius where the large-diameter front wind rotor is, is not expected to effectively absorb the wind energy. For instance, the rotation torque generated from the front wind rotor G with the diameter $d_F$ of 500 mm is 0.1136 Nm at 50% of the tip side and is 0.0096 Nm at 50% of the hub side, in the vicinity of the maximum output operation. Thus, it can be confirmed that the contribution of the rotational torque generated at the hub side is quite small in terms of output (=rotation torque×rotational angular velocity).

The tandem window rotors are not constructed merely by combining optimal single wind rotors with each other, but should be designed so that the front wind rotor having the blade which does not absorb wind energy at the smaller radius, as mentioned above. The rear wind rotor is designed to match the flow condition from the front wind rotor, as follows.

The rear is formed with the cambered aerofoil so as to take the expected rotational torque regardless of the radius. Then, the rear blade is twisted radially to make the angle of attack smaller by a predetermined margin angle for operating the rotor at the stable condition than the angle of attack providing the maximum lift-drag ratio against the swirling flow discharged from the front wind rotor, at the larger radius than the intermediate radius of the front wind rotor. As for the rear blade profile at the smaller radius than the intermediate radius of the front wind rotor, the blade is also radially twisted so as to make the angle of attack smaller by a predetermined margin angle for operating the rotor at the stable condition than the an angle of attack providing the maximum lift-drag ratio against the axial flow without the swirling component.

Figure 14:
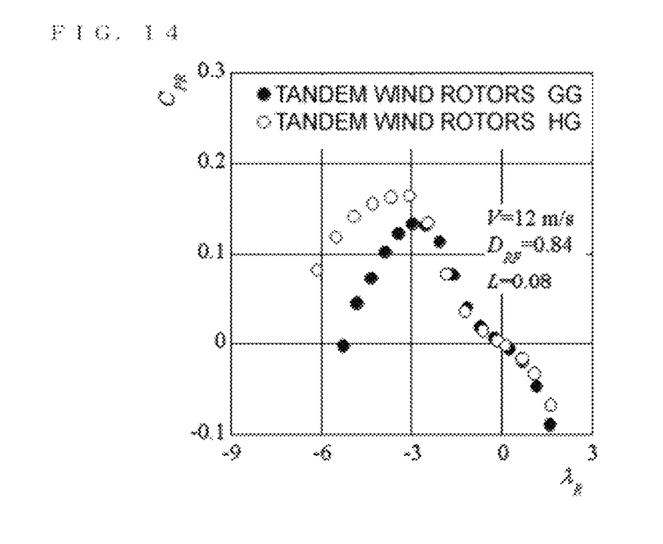
FIG. 14 is a graph showing how a blade configuration of a front wind rotor affects an output power generated by a rear wind rotor.

FIG. 14 shows the results verifying the increase of the output, and shows the effect of the blade profile in the front wind rotor on the output of the rear wind rotor $C_{PR}$ (the rear blade G, $\lambda_R$: the tip speed ratio in the rear wind rotor). By using the above-mentioned front blade H, it is possible to provide sufficient wind energy to the rear wind rotor, and the output coefficient $C_{PR}$ is significantly increased.

Figure 15:
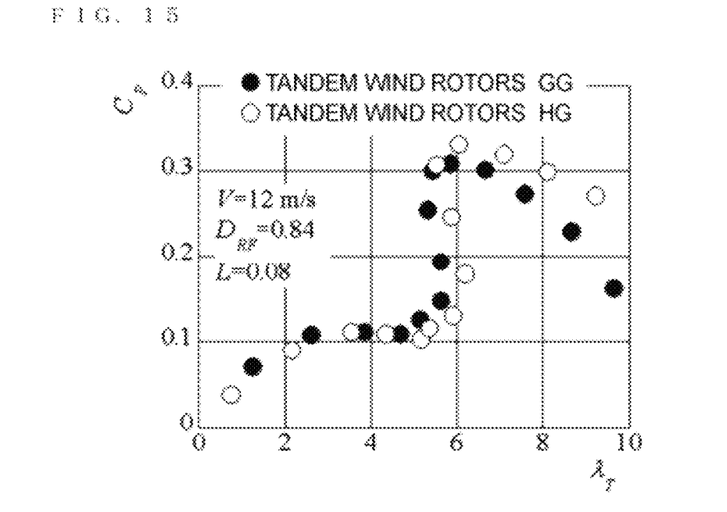
FIG. 15 is a graph showing a relation between a relative circumferential speed and an output coefficient in tandem wind rotors.

Since the front blade H does not work at the smaller radius, the output coefficient $C_{PR}$ decreases in comparison with other wind rotors (the maximum output coefficient of the front blade H is 0.160, whereas the coefficient of the front blade G is 0.175). However, the front blade H can significantly enhance the output of the rear wind rotor (the maximum output coefficient of the rear blade G with the front blade G being used is 0.138, whereas the maximum output coefficient of the rear blade G with the front blade H being used is 0.165). Resultantly, the output as the tandem rotor type wind turbine generator is increased (FIG. 15), where the output coefficient Cp of the front wind rotor with the blade G without the rear wind rotor is 0.287.

INDUSTRIAL APPLICABILITY

The present invention is applicable, as a wind turbine generator providing the higher output, to various fields such as a wind turbine generating industry, a machinery industry, an electricity industry, and an electric power industry which aim at generating clean energy.

While the present invention has been described in connection with certain exemplary embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The invention claimed is:

1. A wind turbine generator comprising:
    a front wind rotor; and
    a rear wind rotor arranged coaxially with said front wind rotor, one of said front wind rotor and said rear wind rotor being connected to a rotatable armature rotor of a generator and the other of said front wind rotor and said rear wind rotor being connected to a rotatable field rotor of the generator, a direction in which a blade of said front wind rotor is twisted being axially opposite to a direction in which a blade of said rear wind rotor is twisted;
    wherein a rotation radius of said rear wind rotor is smaller than a rotation radius of said front wind rotor, but said rotation radius of said rear wind rotor is longer than a half of said rotation radius of said front wind rotor;
    wherein said front wind rotor includes a blade having, in an area outward of an intermediate point of said rotation radius of said front wind rotor, a blade element comprised of an aerofoil being cambered in a cross-section along a rotational direction thereof so as to ensure an expected rotational torque, said blade element being radially twisted so as to ensure an angle of attack smaller by a predetermined stable margin angle than an angle of attack providing a maximum lift-drag ratio regardless of a radial position;
    wherein said blade of said front wind rotor is, in an area inward of said intermediate point of said rotation radius of said front wind rotor, radially twisted so as to ensure an angle of attack at which a drag acting on said blade element is small, and a total force of the drag and a lift force is axially directed, regardless of a radial position of said front wind rotor, to ensure a no-load condition;
    wherein said rear wind rotor includes a blade having a blade element comprised of an aerofoil cambered in a cross-section along a rotational direction thereof so as to ensure an expected rotational torque;
    wherein said rear wind rotor is radially twisted in an area corresponding to said area outward of said intermediate point of said rotation radius of said front wind rotor, so as to ensure an angle of attack smaller by a predetermined stable margin angle than an angle of attack providing a maximum lift-drag ratio to a swirling flow discharged from said front wind rotor; and
    wherein said rear wind rotor is radially twisted in an area corresponding to said area inward of said intermediate point of said rotation radius of said front wind rotor, so as to ensure an angle of attack smaller by a predetermined stable margin angle than an angle of attack providing a maximum lift-drag ratio against axial flow having no swirling components.

2. The wind turbine generator as set forth in claim 1, wherein said front wind rotor and said rear wind rotor are set close to each other, said front wind rotor having three blades, and said rear wind rotor having a quantity of blades in a range of four to six.

3. The wind turbine generator as set forth in claim 1, wherein said rear wind rotor has a rotation radius about 0.84 times smaller than a rotation radius of said front wind rotor.

4. The wind turbine generator as set forth in claim 1, wherein said stable margin angle is in a range of 2 degrees to 5 degrees, both inclusive.

5. The wind turbine generator as set forth in claim 1, wherein said intermediate point in said front wind rotor is located at 40% to 60%, both inclusive, of said rotation radius of said front wind rotor.

* * * * *